(12) United States Patent
Byun

(10) Patent No.: US 7,620,104 B2
(45) Date of Patent: Nov. 17, 2009

(54) VIDEO CODING SYSTEM

(75) Inventor: Hyun Il Byun, Seoul (KR)

(73) Assignee: C&S Technology Co., Ltd., Seoul (KR)

( * ) Notice: Subject to any disclaimer, the term of this patent is extended or adjusted under 35 U.S.C. 154(b) by 963 days.

(21) Appl. No.: 11/034,270

(22) Filed: Jan. 12, 2005

(65) Prior Publication Data

US 2005/0152451 A1 Jul. 14, 2005

(30) Foreign Application Priority Data

Jan. 13, 2004 (KR) .................. 10-2004-0002200

(51) Int. Cl.
*H04N 7/12* (2006.01)

(52) U.S. Cl. .................. 375/240.03; 375/240.04; 375/240.05; 375/240.06; 375/240.07; 375/240.25; 375/240.26

(58) Field of Classification Search ................... 375/240.03–240.07, 240.25–240.26
See application file for complete search history.

(56) References Cited

U.S. PATENT DOCUMENTS 5,969,764 A * 10/1999 Sun et al. ............... 375/240.06

* cited by examiner

*Primary Examiner*—Andy S Rao
*Assistant Examiner*—Geepy Pe
(74) *Attorney, Agent, or Firm*—Harness, Dickey & Pierce, PLC

(57) ABSTRACT

A digital video coding system is provided that is capable of reducing the load of a CPU (Central Processing Unit) that controls a video coding system for implementing a digital video data compression/decompression standard such as MPEG-1, 2, 4, H.261 or H.263. In a conventional video coding system, the circuit configuration and control method of a variable length encoder are becoming increasingly complex with the development of a video compression/decompression standard. In a conventional system structure, a complex control operation must be carried out, such that there is a problem in that the load of the CPU controlling the video coding system increases. Thus, the video coding technology is provided to reduce the load of the CPU necessary for controlling a VLC (Variable Length Coding) unit.

5 Claims, 13 Drawing Sheets

(Priort Art)

VIDEO CODING SYSTEM

BACKGROUND OF THE INVENTION

1. Field of the Invention

The present invention relates to digital video coding technology, and more particularly to a system and method for carrying out video coding through DCT (Discrete Cosine Transform), motion compensation and motion estimation.

2. Description of the Related Art

In a conventional video coding system, the circuit configuration and control method of a variable-length encoder are becoming increasingly complex with the development of a video compression/decompression standard. For example, when video is coded using the MPEG-4 (Moving Picture Experts Group 4) video coding standard, a data partitioning mode can be used to enhance error resilience. In this case, a texture of a macroblock and two headers in a single video packet must be sent on a type-by-type basis. In a structure of the variable-length encoder for separately sending the headers and the texture in a macroblock unit, complex control must be carried out so that a user configures a video packet, such that there is a problem in that the load of a CPU (Central Processing Unit) controlling the video coding system increases.

FIG. 1 is a block diagram illustrating an example of a conventional encoder based on MPEG-4. Referring to FIG. 1, an encoder 100 comprises an ME (Motion Estimation) unit 101; an MC (Motion Compensation) unit; a DCT/Q (Discrete Cosine Transform/Quantization) unit 103a; an ADP (AC/DC Prediction) unit 104; a VLC (Variable Length Coding) unit 105; and an IQ/IDCT (Inverse Q/Inverse DCT) unit 106.

The ME unit 101 carries out a task for estimating a motion change of a current frame from a previous frame. A result of the task is represented by a motion vector. The motion vector indicates the quantity and direction of movement of a related macroblock or block of the current frame from the previous frame. When this motion estimation is used, temporal iteration is removed and hence coding quantity can be reduced. The macroblock consists of 16×16 pixels, and is configured by 4 luminance blocks and 2 chrominance blocks. Thus, the macroblock contains a total of 6 blocks and each block consists of 8×8 pixels.

The MC unit is divided into MC (−) (MC minus) 102a and MC (+) (MC plus) 107. The MC (−) 102a carries out a task for subtracting a motion estimation result of the previous frame from the current frame, thus producing frame data in which temporal iteration is removed. The MC (+) 107 carries out a task for adding the previous frame used in the MC (−) 102a to a result produced by the IQ/IDCT part 106 to be described below, thus obtaining a video frame to be finally viewed through a decoder. This video frame is utilized as the previous frame when the next frame is coded.

The DCT/Q unit 103a transforms video data of a spatial domain into video data of a frequency domain, and quantizes a result of the transformation to limit the video data of the frequency domain to a discrete set of values.

The ADP unit 104 produces a difference value between an AC/DC coefficient of a current block and an AC/DC coefficient of a surrounding block. This is aimed to reduce coding quantity using spatial continuity.

The VLC unit 105 performs variable length coding on coefficients in which ADP has been completed, thereby generating a coded bitstream. At this point, the bitstream is configured in the form of a video packet containing data of the predetermined number of macroblocks.

The IQ/IDCT unit 106 performs inverse quantization on coefficients in which DCT/Q has been completed and transforms a result of the inverse quantization into data of the spatial domain. Video after the IQ/IDCT is different from video after the MC (−) in that data of the video after the IQ/IDCT may be slightly lost by quantization and inverse quantization of the DCT/Q unit 103a and the IQ/IDCT unit 106. However, the video data based on the quantization and inverse quantization is obtained to produce video data appropriate to a decoder.

FIG. 2 is a block diagram illustrating a conventional image coding system. The conventional video coding system comprises an encoder 100, memories 204 and 205, a CPU (Central Processing Unit) 201, a main memory 202 and a data bus 203.

An encoder 100 is divided into a motion estimation section and a texture coding section. The motion estimation section is configured by an ME (Motion Estimation) unit 101 and the texture coding section is configured by an MC (Motion Compensation) unit 102, a DCT/IDCT (Discrete Cosine Transform/Inverse Discrete Cosine Transform) unit 103, an ADP (AC/DC Prediction) unit 104 and a VLC (Variable Length Coding) unit 105. The two sections can operate independently of each other. However, texture coding requires a motion vector produced after ME is performed.

ME in the ME unit 101 operates in a macroblock unit. During the ME, the texture coding section including the units 102 to 105 iterate an operation based on a unit of a block 6 times.

The memories 204 and 205 store data necessary for texture coding, and the CPU 201 and the main memory 202 control operations associated with blocks.

The data bus 203 is provided so that the encoder 100 can exchange data with an external memory.

FIG. 3 shows a sequence of a method for coding a frame consisting of N macroblocks using the encoder based on a pipeline structure.

First, ME (Motion Estimation) for Macroblock 0 is performed. At this point, because a motion vector of Macroblock 0 is not present, texture coding of Macroblock 0 cannot be performed.

Subsequently, while the ME for Macroblock 1 is performed, the motion vector of Macroblock 0 appears and simultaneously the texture coding for Macroblock 0 can be performed. In this manner, when the coding is performed, the ME for the last macroblock is not performed and only texture coding for the last macroblock is performed.

FIG. 4 is a block diagram illustrating the conventional VLC (Variable Length Coding) unit.

A header indicating the characteristics of the macroblock and a texture in which video data is included configures a coded macroblock.

A header coding control part (header_ctrl) 306 is responsible for controlling header coding.

A header ROM (Read Only Memory) table (mb_rom) 307 includes various tables necessary for the header coding.

A header memory (hmem) 305 stores a result of the header coding.

A texture coding control part (texture_ctrl) 302 is responsible for controlling texture coding.

A texture ROM table (ac_rom) 303 includes various tables necessary for the texture coding.

A texture memory (tmem) 301 stores a result of the texture coding.

A VLC register (vlc_reg) 304 receives various setup items necessary for the header and texture coding from the CPU 201 and provides the received setup items to the texture coding control part (texture_ctrl) 302 and the header coding control part (header_ctrl) 306. Furthermore, the VLC register (vlc_reg) 304 receives information indicating how many bits have been generated as a result of the coding from the texture coding control part (texture_ctrl) 302 and the header coding control part (header_ctrl) 306, and provides the received information to the CPU 201.

FIG. 5 is a flowchart illustrating a VP (Video Packet) coding process when data is partitioned. Here, the VP is a unit of data for packing one or more macroblocks. A fixed-length code (resynchronization marker) of a bitstream is arranged in a header of the VP and part of frame header information is repeated subsequent to the fixed-length code, such that error resilience is enhanced. A data partitioning mode is an operating mode for positioning important header information at a leading portion of the VP. Headers are classified into Header 1 and Header 2 according to importance. A marker consisting of a specific bitstream is inserted between Header 1 and Header 2.

Referring to FIG. 5, a resynchronization marker and a VP header are inserted (S100).

Subsequently, macroblock coding is carried out (S110). When the coding is completed, bitstreams of Header 1 and Header 2 are stored in the header memory (hmem) 305 and a bitstream of a texture is stored in the texture memory (tmem) 301.

Subsequently, the main memory 202 stores the bitstreams of the Header 1, Header 2 and texture in separate spaces, respectively (S112 to S116). After all macroblocks contained in the VP are coded, independent spaces are required so that the Header 1, Header 2 and texture can be merged with other Headers 1, other Headers 2 and other textures, respectively.

Subsequently, a determination is made as to whether or not the VP has been completed (S118). A total length value of Headers 1, Headers 2 and textures is calculated after the first macroblock of the VP. When the calculated value is larger than a predetermined target value, it is determined (S120) that the VP has been completed.

If the VP has been completed, step S122 is performed. Otherwise, the above step S110 is performed. At the above step S122, a process for packing the Headers 1, Headers 2 and texture produced from the macroblocks corresponding to the current VP is performed.

At last, a VP stream is fetched at step S124.

As described above, a user must merge header and texture bitstreams produced as a result of macroblock coding in the prior art, and hence the load of a CPU increases. In particular, when data has been partitioned, the Headers 1, Headers 2 and textures of all macroblocks in the VP are separately stored. Then, when the VP has been completed, the user must perform a packing task for merging the Headers 1, Headers 2 and textures. The packing task requires a large number of bit shifts and memory inputs and outputs, resulting in an increased load of the CPU. This problem cannot be fundamentally addressed by the conventional coding system even though a coding method is changed.

SUMMARY OF THE INVENTION

Therefore, the present invention has been made in view of the above and other problems, and it is an object of the present invention to reduce the load of a CPU (Central Processing Unit) that controls a video coding system for implementing a digital video data compression/decompression standard such as MPEG-1, 2, 4, H.261 or H.263.

In accordance with an aspect of the present invention, the above and other objects can be accomplished by the provision of a video coding system for performing video coding through DCT (Discrete Cosine Transform), MC (Motion Compensation) and ME (Motion Estimation j, comprising: an MC unit for producing an MAD (Mean Absolute Difference) value of a current macroblock; a control unit for estimating the number of bits of the current macroblock based on the MAD value and a QP (Quantization Parameter) and controlling an end of a VP (Video Packet); and a VLC (Variable length coding) unit for performing the ME, texture coding, and a packing task associated with all macroblocks of the VP under control of the control unit.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, preferred embodiments of the present invention will be described in detail with reference to the annexed drawings.

Figure 6:
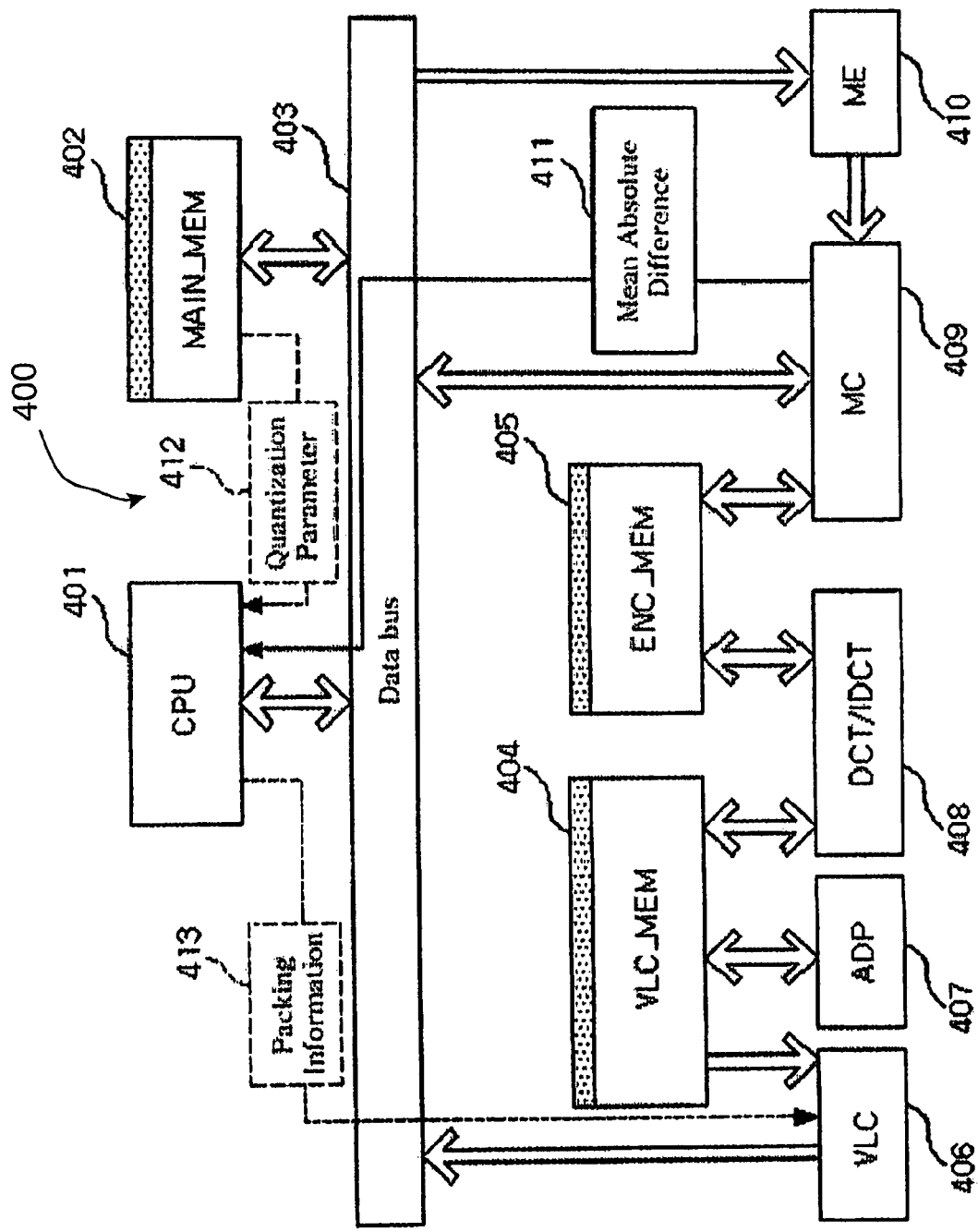
FIG. 6 is a block diagram illustrating a video coding system in accordance with the present invention.

FIG. 6 is a block diagram illustrating a video coding system in accordance with the present invention.

Figure 1:
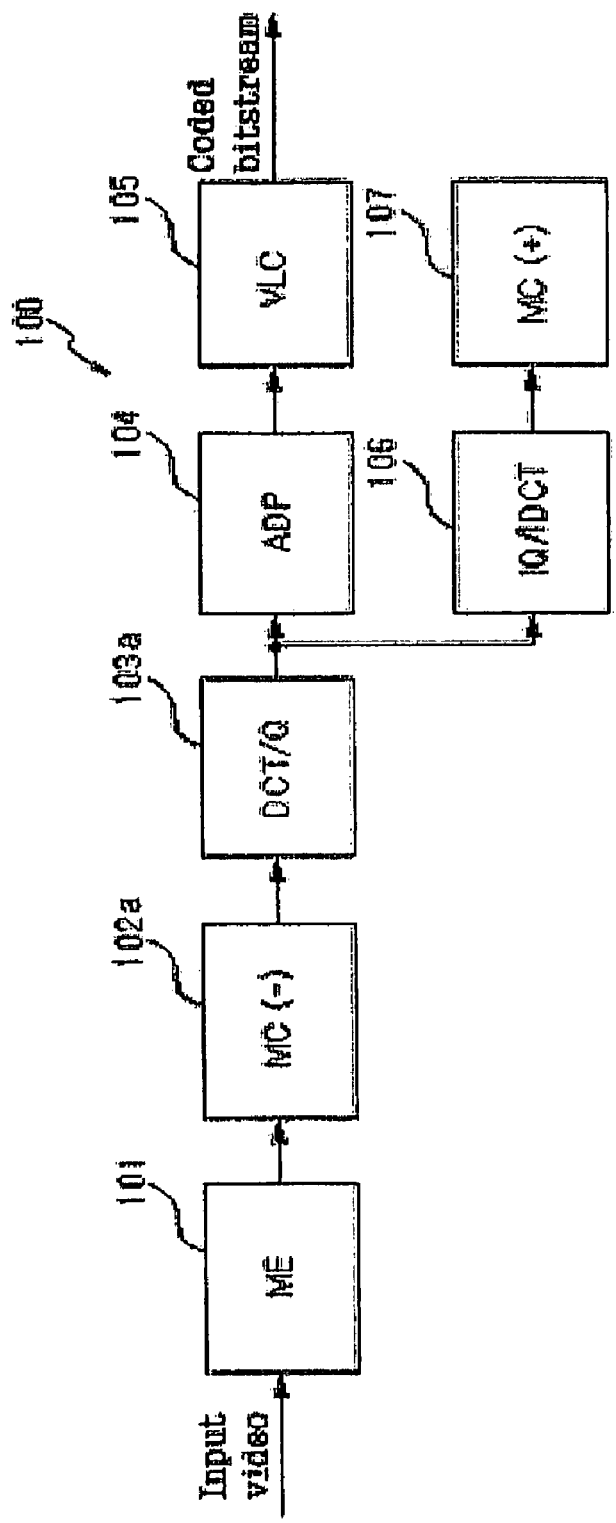
FIG. 1 is a block diagram illustrating a conventional encoder.
Figure 2:
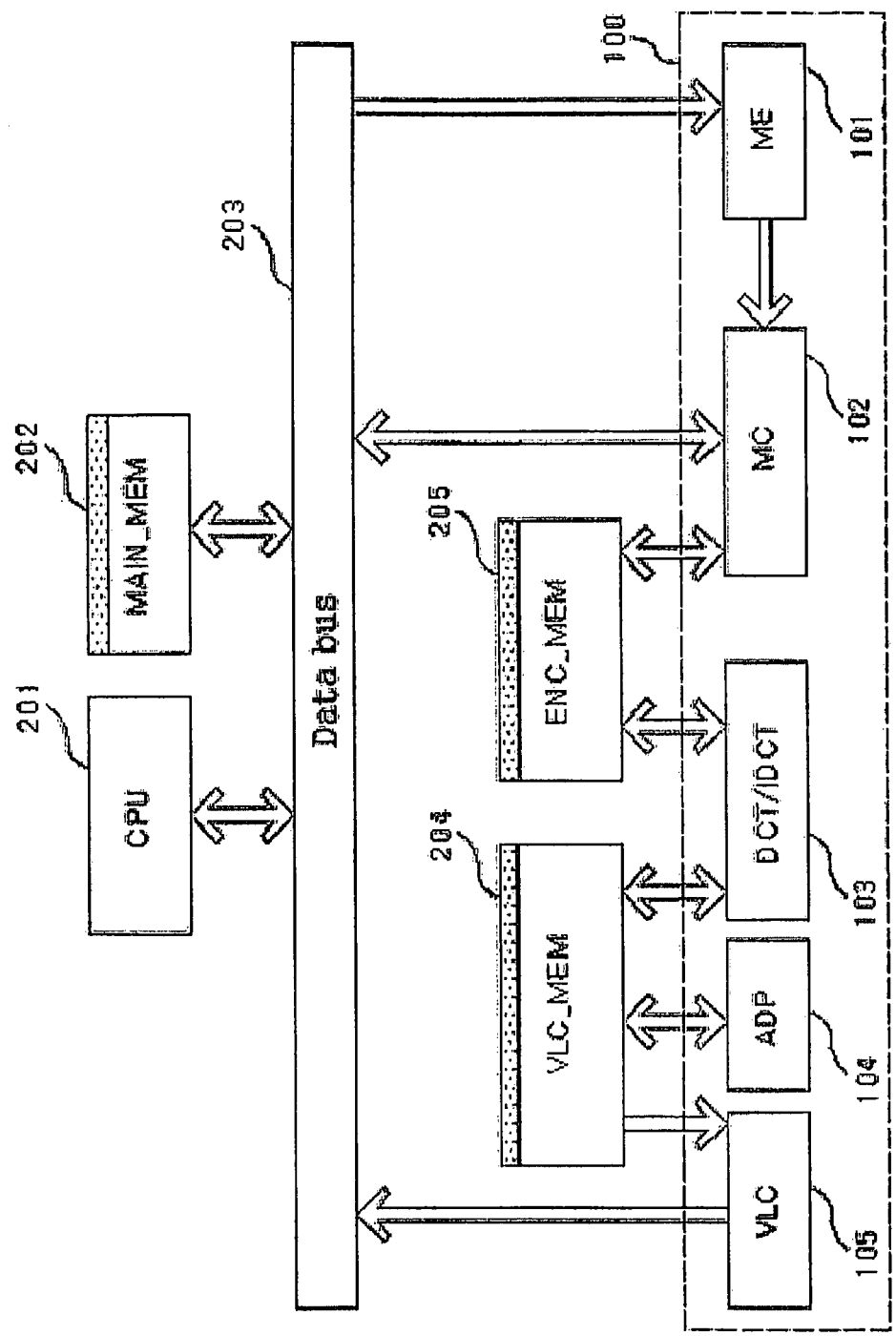
FIG. 2 is a block diagram illustrating a conventional video coding system.
Figure 3:
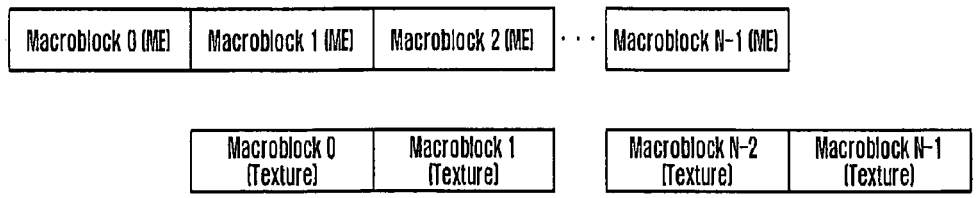
FIG. 3 shows a sequence of a method for coding a frame consisting of N macroblocks using the encoder based on a pipeline structure.
Figure 4:
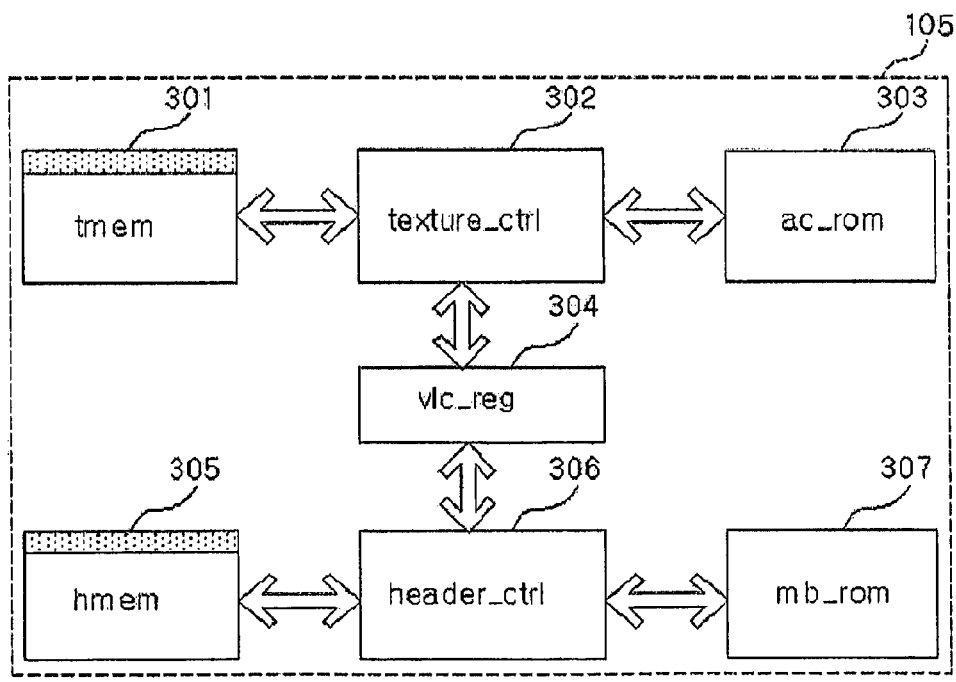
FIG. 4 is a block diagram illustrating a conventional VLC (Variable Length Coding) unit.
Figure 5:
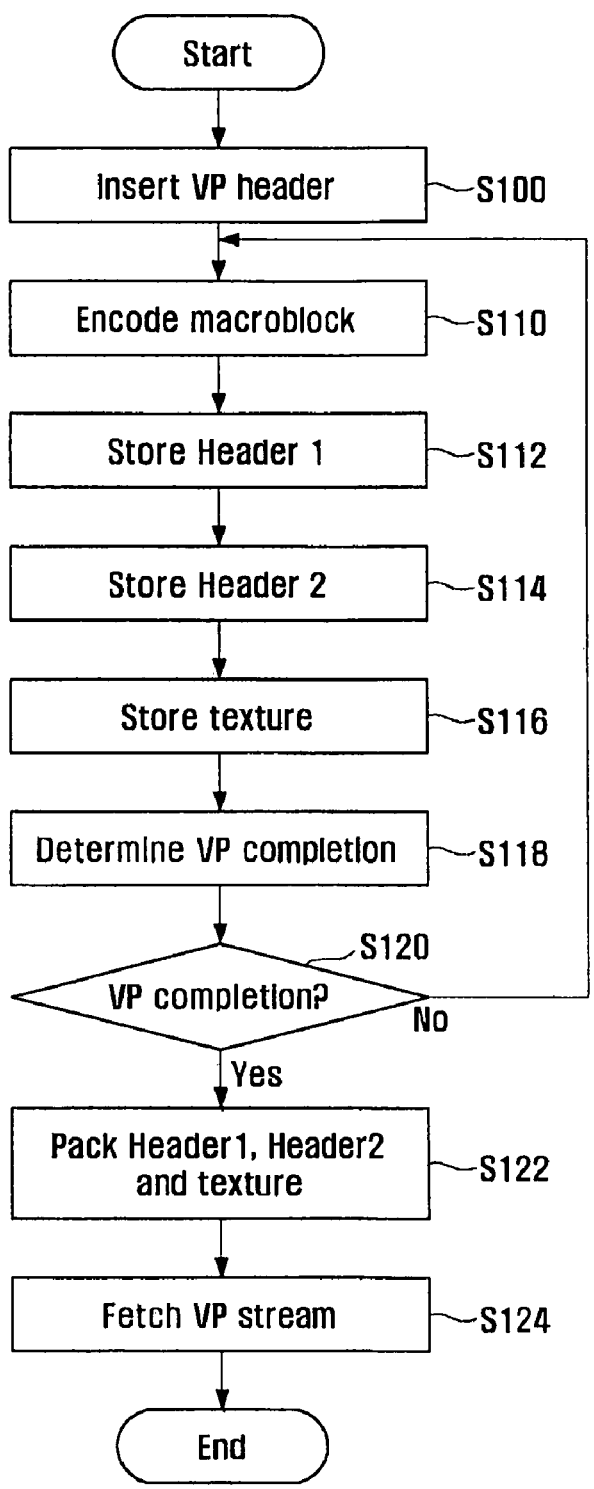
FIG. 5 is a flowchart illustrating a VP (Video Packet) coding process when data is partitioned.

Referring to FIG. 6, the video coding system in accordance with the present invention comprises an encoder 400, ADP Unit 407, DCT/IDCT Unit 408, memories 404 and 405, a CPU (Central Processing Unit) 401, a main memory 402 and a data bus 403. Functions of these components are the same as those of the encoder 100, ADP Unit 104, DCT/IDCT 103 Unit, the memories 204 and 205, the CPU 201, the main memory 202, and the data bus 203 in the conventional video coding system shown in FIG. 2. The video coding system in accordance with the present invention is different from the conventional video coding system in that a VLC (Variable Length Coding) unit 406 is improved so that a packing task can be effectively performed and an MC (Motion Compensation) unit 409 produces and outputs an MAD (Mean Absolute Difference) value.

The MAD value is a value produced by dividing a sum of absolute values of pixels by 256 after calculating a difference value between current frame data and motion estimation data for a single macroblock. As the MAD value increases so does the length of a coded bit stream.

Reference numeral 411 denotes the MAD value produced by the MC unit 409, and reference numeral 412 denotes a QP (Quantization Parameter) value to be applied to a current macroblock. As described below, the MAD value and the QP value are used for estimating the number of bits after the current macroblock is coded. Moreover, reference numeral 413 denotes packing information provided to the VLC unit 406. When the packing information is 1, the packing is performed for the current macroblock. Otherwise, when the packing information is 0, no packing is performed. For reference, the QP value can be determined by an algorithm that controls a quantization rate as is well known.

Figure 7:
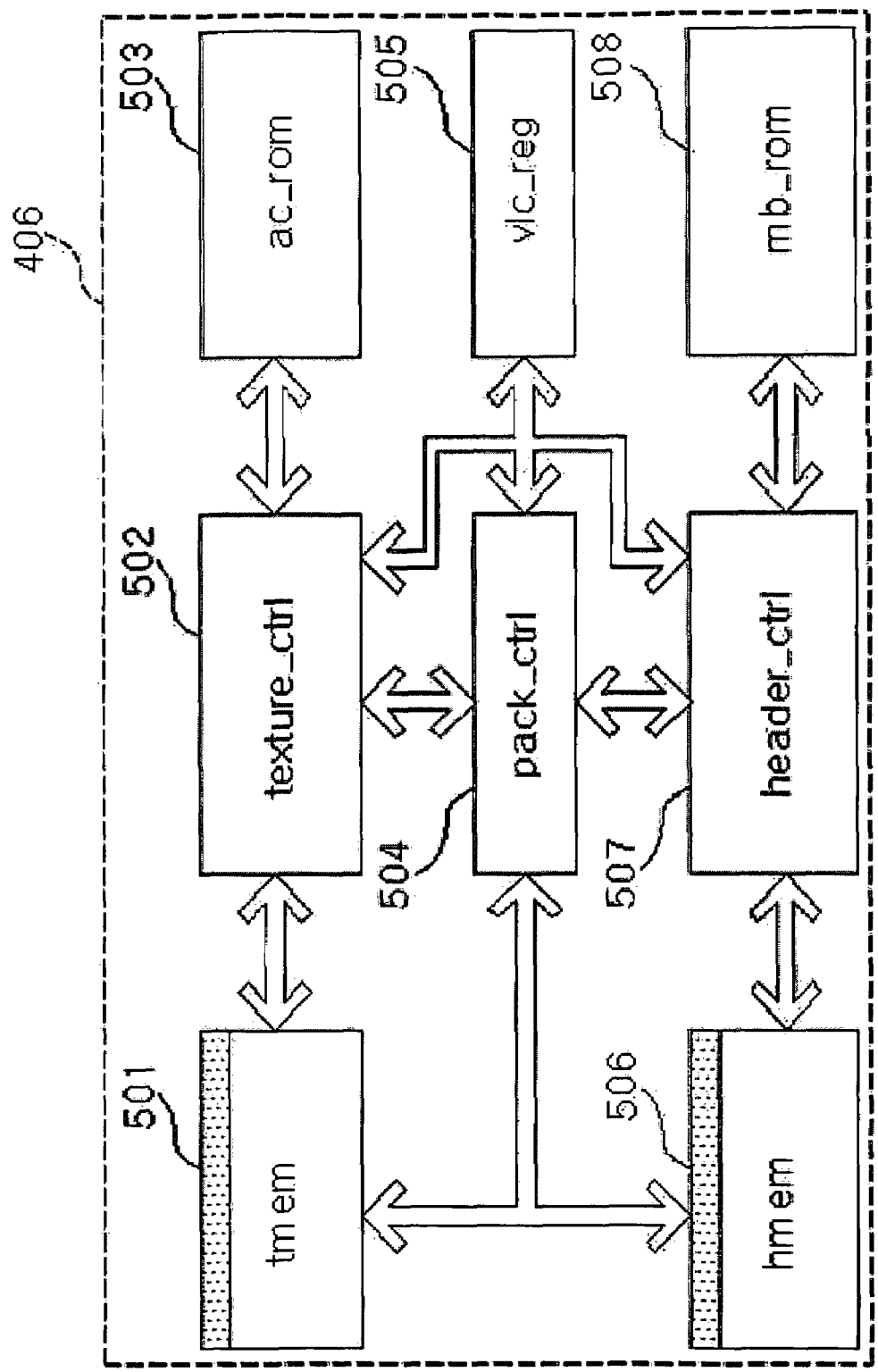
FIG. 7 is a block diagram illustrating a VLC unit in accordance with the present invention.

FIG. 7 is a block diagram illustrating the VLC unit 406 in accordance with the present invention.

A header ROM (Read Only Memory) table (mb_rom) 508 includes various tables necessary for header coding.

A header memory (hmem) 506 stores a result of the header coding. Headers can be classified into Header 1 and Header 2 according to a data partitioning mode.

A texture coding control part (texture_ctrl) 502 is responsible for controlling texture coding.

A texture ROM table (ac_rom) 503 includes various tables necessary for the texture coding.

A texture memory (tmem) 501 stores a result of the texture coding.

A packing execution part (pack_ctrl) 504 is responsible for packing the header and texture. The packing task reads a predetermined unit of data from the header memory (hmem) 506 and/or the texture memory (tmem) 501, and packs the read data and re-writes the data to the header memory (hmem) 506.

The packing task is performed in the following cases.

First, the packing task is performed when a packing command is received after macroblock coding through a control signal associated with the packing information from the CPU 401, that is, a PEN value 413, before the macroblock coding is initiated.

Second, the packing task is performed when the texture memory (tmem) 501 or the header memory (hmem) 506 overflows while the macroblock coding is being performed.

A VLC register (vlc_reg) 505 receives various setup items necessary for the header and texture coding from the CPU 401 and provides the received setup items to the texture coding control part (texture_ctrl) 502, the packing execution part (pack_ctrl) 504 and the header coding control part (header_ctrl) 507.

Figure 8:
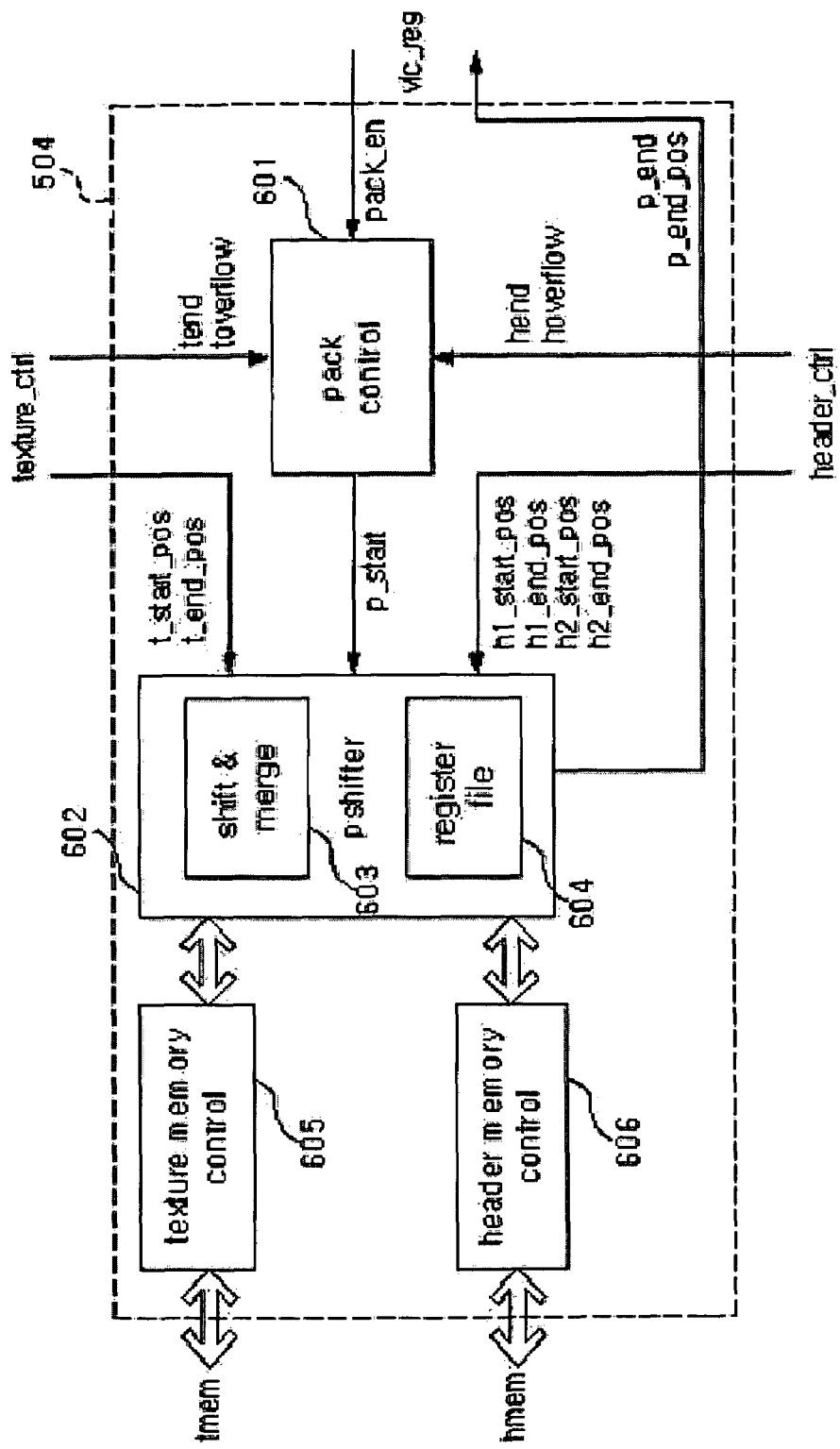
FIG. 8 is a block diagram illustrating a packing execution part (pack_ctrl) in accordance with the present invention.

FIG. 8 is a block diagram illustrating the packing execution part (pack_ctrl) 504 in accordance with the present invention. Referring FIG. 8, the packing execution part (pack_ctrl) 504 comprises a packing control sub-part (pack control) 601, a packing operation sub-part (pshifter) 602, a texture memory control sub-part 605 and a header memory control sub-part 606.

The packing control sub-part (pack control) 601 is responsible for entirely controlling the packing execution part (pack_ctrl). Here, a signal "pack_en" inputted from the VLC register (vlc_reg) 505 has a value equal to the PEN value 413 and indicates whether or not the packing must be enabled.

Moreover, a signal "hend" inputted from the header coding control part (header_ctrl) 507 indicates that the header coding on the current macroblock has been completed. A signal "hoverflow" indicates that the packing must be performed irrespective of the signal "pack_en" because overflow has occurred in the course of the header coding.

Moreover, a signal "tend" inputted from the texture coding control part (texture_ctrl) 502 indicates that the texture coding on the current macroblock has been completed. A signal "toverflow" indicates that the packing must be performed irrespective of the signal "pack_en" because overflow has occurred in the course of the texture coding.

The packing control sub-part (pack control) 601 determines whether or not the header coding and the texture coding have been completed, respectively, through the signals "tend" and "hend" when the signal "pack_en", "toverflow" or "hoverflow" is 1. If the header coding and the texture coding have been completed, respectively, the packing control sub-part (pack control) 601 sends a packing start command through a signal "p_start".

The packing operation sub-part (pshifter) 602 performs a packing task. The packing operation sub-part (pshifter) 602 receives signals "h1_start_pos", "h1_end_pos", "h2_start_pos" and "h2_end_pos" from the header coding control part (header_ctrl) 507. The signals "h1_start_pos", "h1_end_pos", "h2_start_pos" and "h2_end_pos" indicate a start position of Header 1, an end position of Header 1, a start position of Header 2 and an end position of Header 2, respectively. When data is not partitioned, the start and end positions of Header 1 correspond to start and end positions of a single header. Values of the signals "h2_start_pos" and "h2_end_pos" are valid when data is partitioned. A signal having a suffix of "_pos" indicates a position based on a bit unit in the texture memory 501 or the header memory 506.

Signals "t_start_pos" and "t_end_pos" received from the texture coding control part (texture_ctrl) 502 indicate start and end positions of the texture in the current macroblock, respectively.

The packing operation sub-part (pshifter) 602 includes a shift & merge element 603 and a register file element 604.

The shift & merge element 603 appropriately shifts and merges two 32-bit units from the texture memory (tmem) 501 and/or the header memory (hmem) 506, and generates a new 32-bit unit as a result of the packing task.

The register file element 604 stores signals "pre_h1_start_pos", "pre_h2_start_pos" and "pre_t_start_pos", and is used only when data is partitioned.

The signal "pre_h1_start_pos" indicates a start position of Header 1 associated with the first macroblock for the VP in the header memory (hmem) 506. The signal "pre_h2_start_pos" indicates a start position of Header 2 associated with the first macroblock of the VP in the header memory (hmem) 506.

The signal "pre_t_start_pos" indicates a start position of a texture associated with the first macroblock for the VP in the texture memory (tmem) 501. Because coded data of all macroblocks contained in the VP must be packed when data is partitioned, contents stored in the register file element 604 are required.

The texture memory control sub-part 605 sends data necessary for the packing task from the texture memory (tmem) 501 to the packing operation sub-part (pshifter) 602.

The header memory control sub-part 606 sends data necessary for the packing task from the header memory (hmem) 506 to the packing operation sub-part (pshifter) 602, and writes the packed data to the header memory (hmem) 506. If the header memory (hmem) 506 is full with the packed data, the packed data is subsequently written to the texture memory (tmem).

Figure 9:
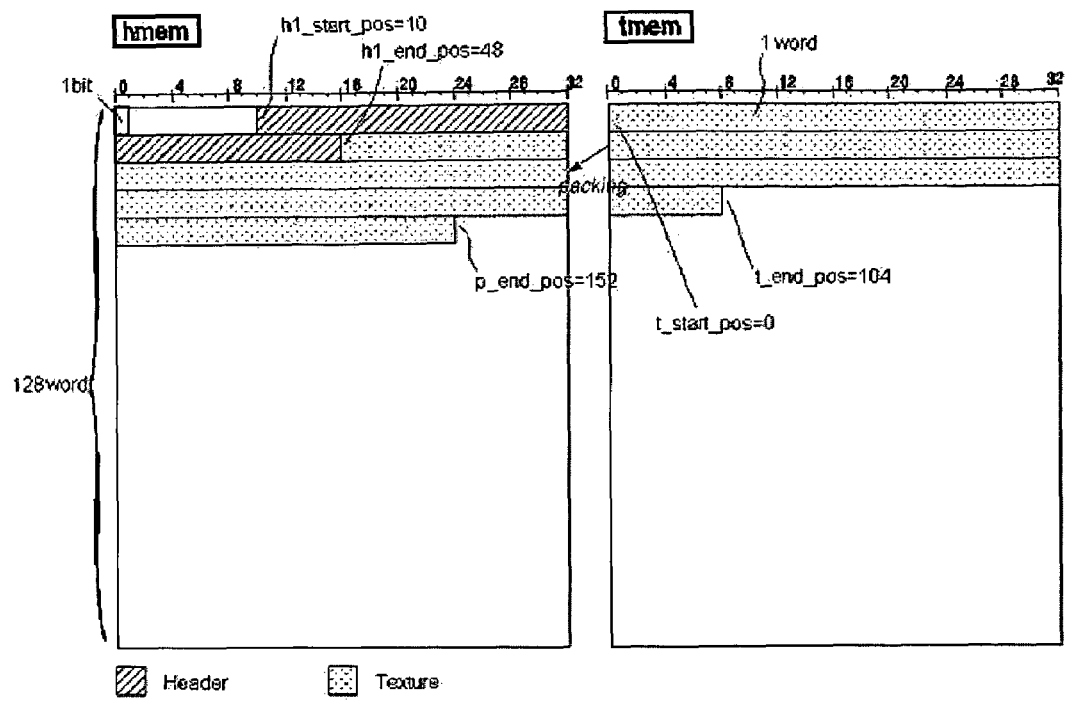
FIG. 9 shows an example of packing when data is not partitioned.

FIG. 9 shows an example of packing when data is not partitioned.

Signals "h1_start_pos" and "t_start_pos" indicate positions (based on a bit unit) in which a header and texture start to be written. When macroblock coding starts and both the header and texture are coded, signals "h1_end_pos" and "t_end_pos" indicate end positions of the header and texture. Then, if the packing has been completed, a signal "p_end_pos" indicates the last macroblock data after the header and texture are packed.

When data is not partitioned, a command is received from the CPU 401 so that the packing task associated with all the macroblocks can be accomplished. In this embodiment, the header memory (hmem) and the texture memory (tmem) have a width of 32 bits, respectively, as shown in FIG. 9, and can store 128 words or 4096 bits.

The signal "h1_start_pos" can have a value between 0 and 4095, and is recommended to have a value between 0 and 31 according to an end position of a previous macroblock stream. The signal "t_start_pos" can have a value between 0 and 4095, and is recommended to have a value of 0 so that a space necessary for writing a coding result can be maximally ensured. When the coding of one macroblock has been completed, a coded stream can be fetched with reference to the signals "h1_start_pos" and "p_end_pos".

Figure 10:
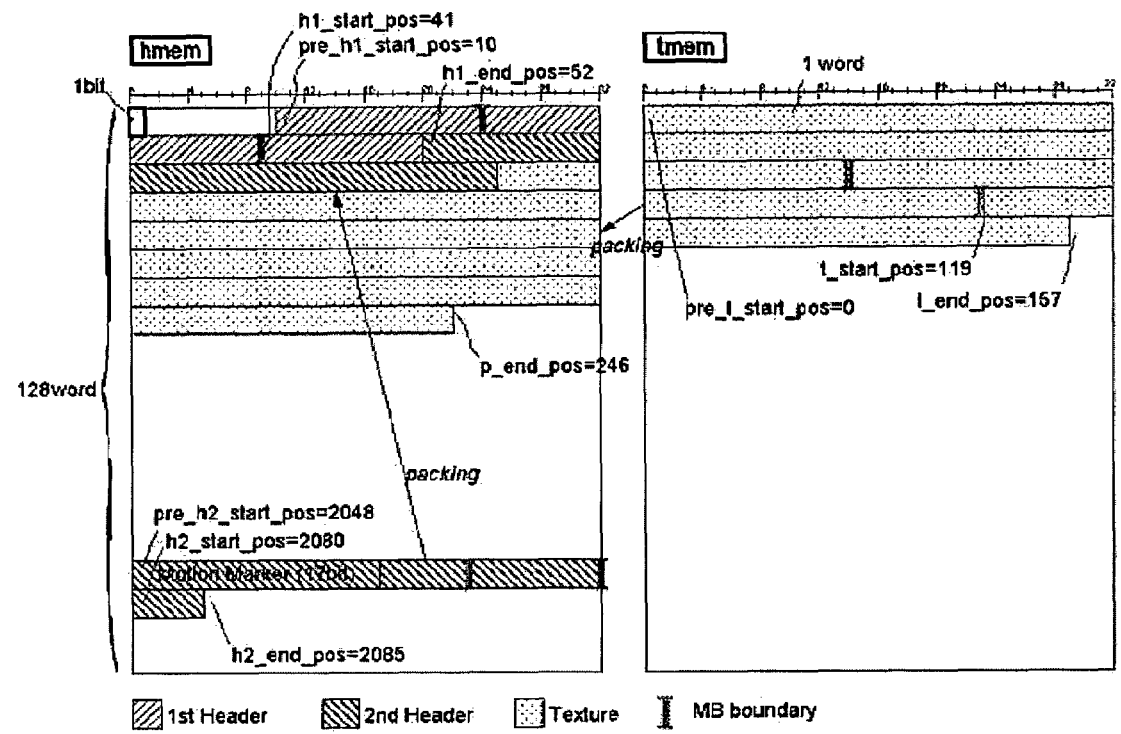
FIG. 10 shows an example of packing when data is partitioned.

FIG. 10 shows an example of packing when data is partitioned. Here, a VP to be coded consists of three macroblocks.

Referring to FIG. 10, signals "h1_start_pos", "h2_start_pos" and "t_start_pos" indicate positions (based on a bit unit) in which Header 1, Header 2 and a texture of the third macroblock, that is, the last macroblock of the VP, start to be written.

Signals "pre_h1_start_pos", "pre_h2_start_pos" and "pre_t_start_pos" indicate positions (based on a bit unit) in which Header 1, Header 2 and a texture of the first macroblock of the VP, start to be written, and are used at a packing time.

Signals "h1_end_pos", "h2_end_pos" and "t_end_pos" indicate end positions in which Header 1, Header 2 and texture of the last macroblock of the VP are written.

FIG. 10 explains a coding operation when the PEN value 413 associated with the second macroblock is set to 0, and the PEN value 413 associated with the third macroblock, that is, the last macroblock of the VP, is set to 1. When Header 1, Header 2 and a texture of the last macroblock of the VP has been completely coded, Headers 1, Headers 2 and textures of the three macroblocks are sequentially packed.

When the texture memory (tmem) overflows while the third macroblock is being coded, the first and second macroblocks are compulsorily packed irrespective of the PEN value 413, and the VLC is terminated.

When data is partitioned, three types of overflow may occur.

The overflow "h1 overflow" indicates the case where a result of Header-1 coding exceeds "h2_start_pos" (i.e., a start address of Header 2).

The overflow "h2 overflow" indicates the case where a result of Header-2 coding exceeds a size of the header memory (hmem).

The overflow "t overflow" indicates the case where a result of texture coding exceeds a size of the texture memory (tmem).

Figure 11:
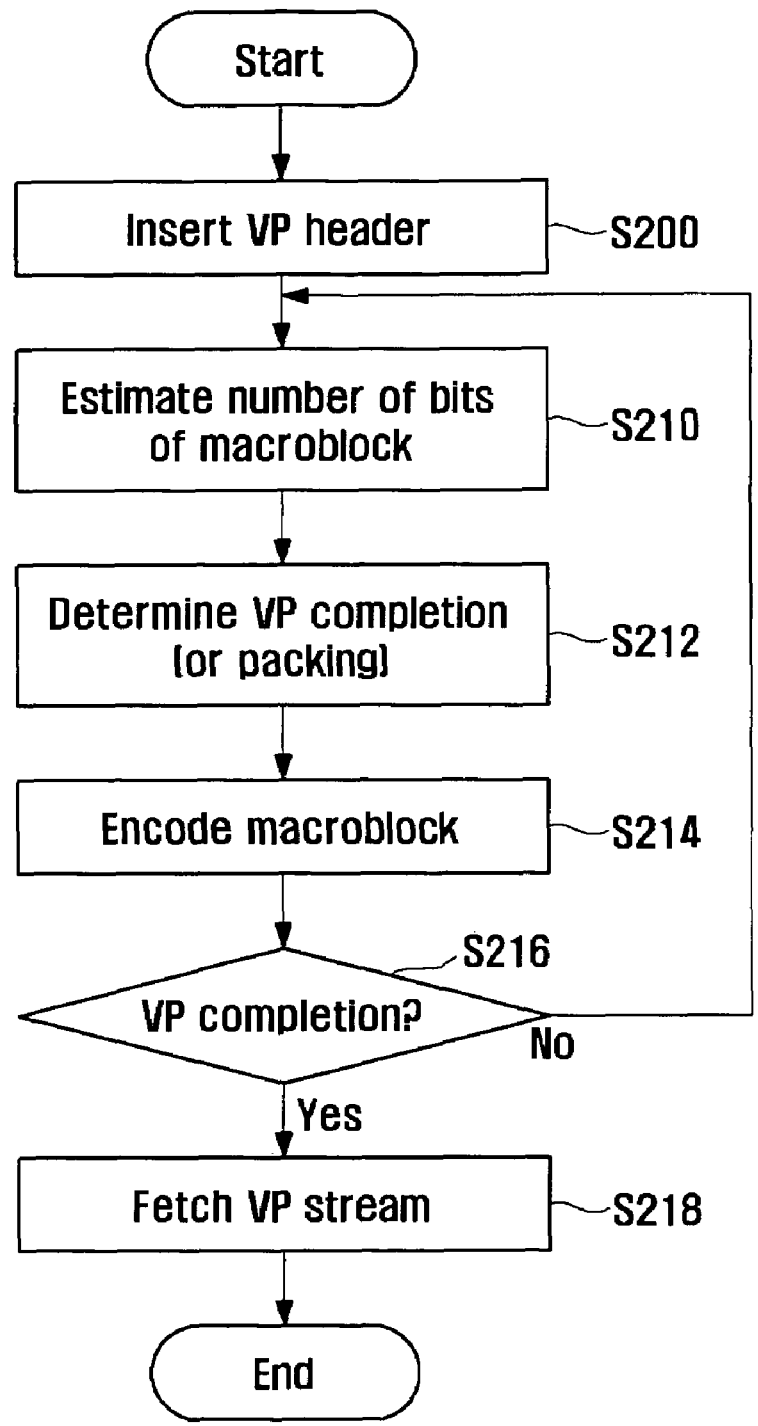
FIG. 11 is a flowchart illustrating a coding process for a VP when data is partitioned in accordance with the present invention.

FIG. 11 is a flowchart illustrating a coding process for a VP when data is partitioned in accordance with the present invention.

At step S200, a resynchronization marker and a VP header are inserted.

At step S210, the length of a bit stream, that is, the number of bits of the current macroblock, is estimated as a coding result of the current macroblock.

The number of bits of the macroblock is estimated as in the following Equation 1.

$$\text{bit}\_{est} = 140 \times (MAD/QP) + \text{offset} \qquad \text{Equation 1}$$

Figure 13:
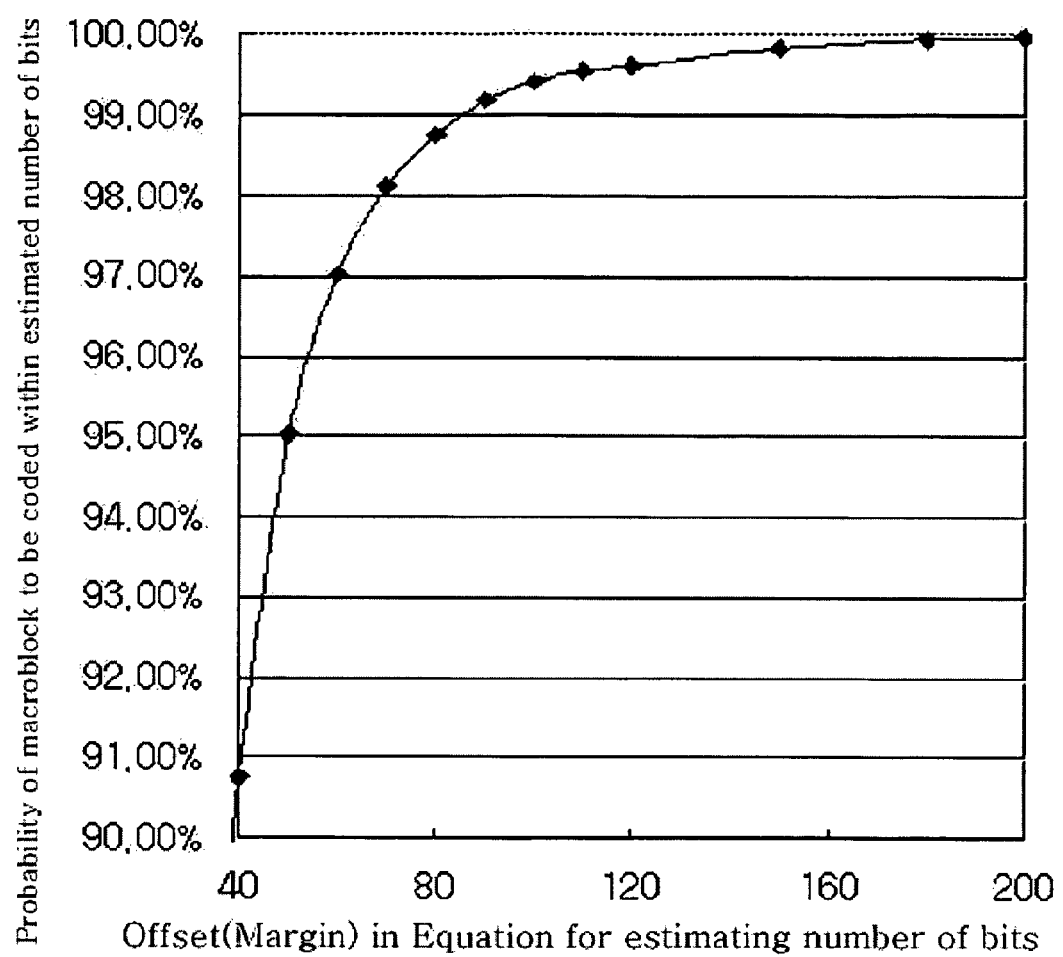
FIG. 13 is a graph illustrating the probability of the actual number of bits being smaller than the estimated number of bits "bit_est" of a macroblock in accordance with an "offset" value shown in the above Equation 1.

In the above Equation 1, "bit_est" denotes the estimated number of bits, "140" is a value produced by experimentation and "offset" is a value equal to or larger than 0. As the size "offset" value increases so does the probability of the actual number of bits being smaller than the "bit_est" value. Detailed values are shown in FIG. 13.

Because the probability of the actual number of bits being larger than the "bit_est" value decreases as the "offset" value increases, overflow can be prevented, but the estimated number of bits tends to greatly increase as compared with the actual number of bits. In the above Equation 1, the MAD and QP are values previously produced from another block, and do not need to be specially produced.

At step S212, a determination is made as to whether or not a VP packing task must be performed. When a value of adding an estimated value to a length value of the current VP is larger than a length value of a predetermined VP or the next macroblock is included in the current VP, it may be predicted that the header memory (hmem) or the texture memory (tmem) overflows. In this case, the PEN value 413 is set to 1, the packing task associated with the current macroblock is performed, and the VP is completed.

At step S214, macroblock coding is performed.

It is determined, at step S216, whether or not the current macroblock is the last macroblock of the VP. If the current macroblock is the last macroblock of the VP, the process proceeds to step S218. Otherwise, the process proceeds to the above step S210.

At the above step S218, a completed VP stream is fetched to the main memory 402.

Figure 12:
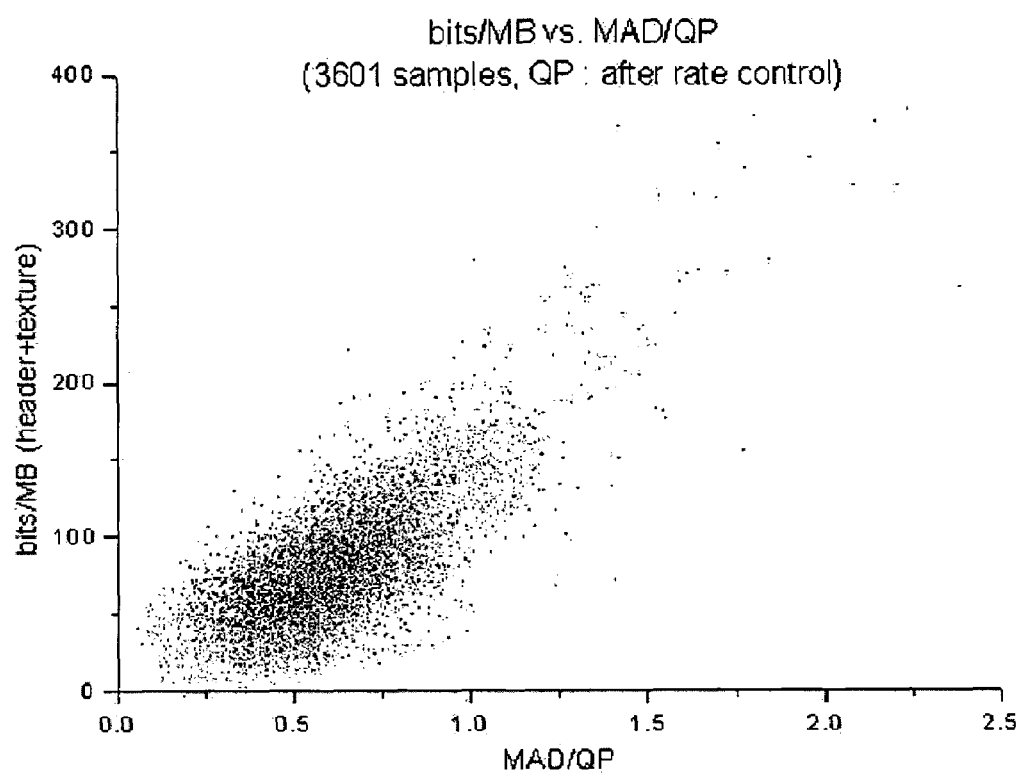
FIG. 12 is a graph illustrating experimental materials based on Equation 1.

FIG. 12 is a graph illustrating experimental materials based on the above Equation 1. The graph shows a relationship between the number of bits per macroblock and an MAD/QP value. It can be seen that the number of bits is different between macroblocks but the number of bits per macroblock is proportional to the MAD/QP value.

FIG. 13 is a graph illustrating the probability of the actual number of bits being smaller than the estimated number of bits "bit_est" of a macroblock in accordance with an "offset" value shown in the above Equation 1. Where "offset" values are 50, 70 and 100, the probabilities of the actual number of bits being smaller than the estimated number of bits "bit_est" of a macroblock are approximately 95.0%, 98.1% and 99.4%, respectively.

If a target VP length almost equals the size of the texture memory (tmem) or the header memory (hmem), overflow can be minimized when the "offset" value is sufficiently large.

If the target VP length is much smaller than the size of the texture memory (tmem) or the header memory (hmem), overflow does almost never occurs when the "offset" value is approximately 50.

Figure 14:
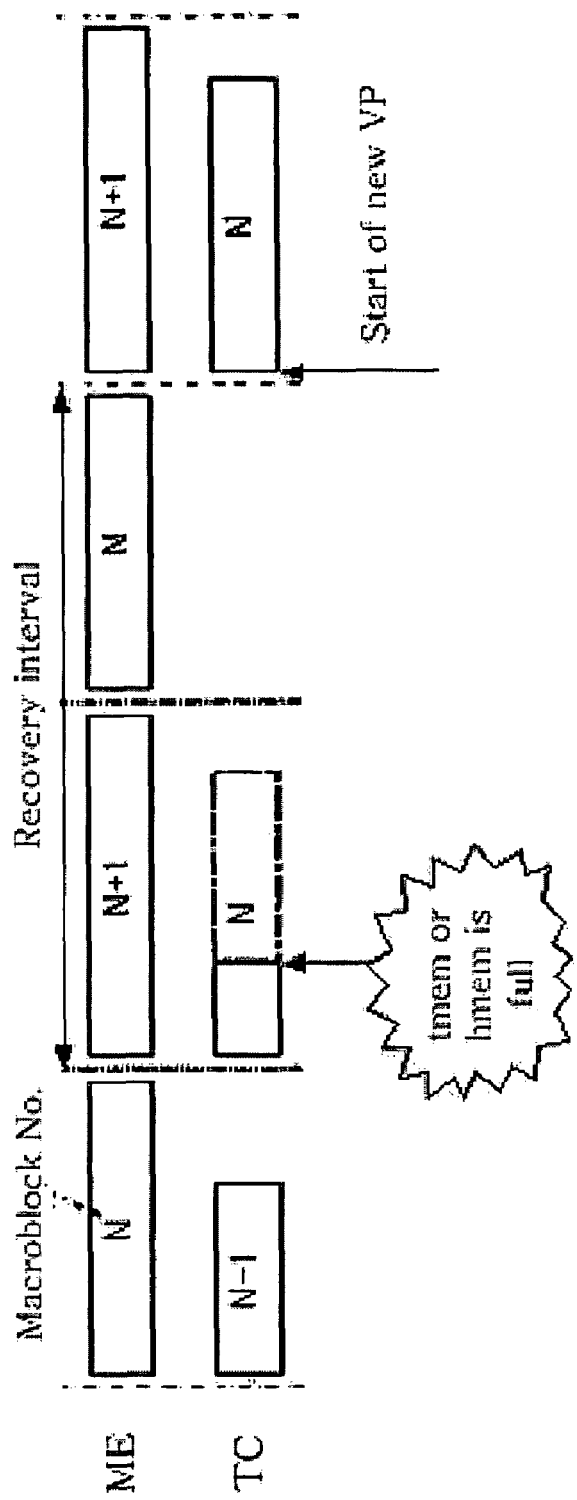
FIG. 14 is a flowchart illustrating a process for processing VLC overflow when data is partitioned in accordance with the present invention.

FIG. 14 is a flowchart illustrating a process for processing VLC overflow when data is partitioned in accordance with the present invention.

When overflow occurs while the N-th macroblock is coded, Headers 1, Headers 2 and textures of up to the (N−1)-th macroblock are packed and then the macroblock coding is finished.

If ME (Motion Estimation) of the (N+1)-th macroblock is in progress when overflow occurs, the process must wait until the ME is finished.

Subsequently, the N-th macroblock is coded. At this point, because memory and register contents from the MC unit 409 and the ME unit 410 are stored appropriate to the (N+1)-th macroblock, the ME of the N-th macroblock needs to be performed once more.

Subsequently, an operating state enters a normal state in which ME of the (N+1)-th macroblock and TC (Texture Coding) of the N-th macroblock can be simultaneously performed.

Thus, whenever overflow occurs, a time for coding two macroblocks is additionally required. However, even though a size of the texture memory (tmem) is set to a size increased by approximately 200 bits as compared with a maximum size of a video packet, the probability of overflow occurrence is maintained to less than $2/100,000$. Assuming that the average number of macroblocks contained in the video packet is 15, the probability of overflow occurrence is more reduced when a size of the texture memory (tmem) is more largely set.

If the header memory (hmem) or the texture memory (tmem) overflows in the course of coding when data is not partitioned as a rare case, the coding system is stopped. If so, macroblock data being coded at a stop time remains in a state in which data is not packed. The unpacked macroblock data is close to noise data. In this case, after a QP value is increased, a coding process can be re-attempted.

Advantageous effects of the present invention are as follows.

First, the video coding system can reduce the load of a CPU (Central Processing Unit) by completely supporting a packing task based on VLC (Variable Length Coding), that is, a process for merging a header (including Header 1 and Header 2 when data is partitioned) and a texture.

Second, the present invention can reduce the load of the CPU because a reading/writing operation associated with a VLC memory, a shift operation and a logic operation are not additionally required after macroblock coding or video packet coding is completed.

Third, control of a video coding system can be simplified. A user can easily shift contents of a texture memory (tmem) to a main memory after the macroblock coding or video packet coding is completed.

Fourth, when data is partitioned, overflow can be excluded while data of various macroblocks of the video packet are simultaneously stored in the texture memory (tmem) and a header memory (hmem) so that the packing task can be supported. When the number of bits of a macroblock is estimated using the above Equation 1, the probability of overflow occurrence can be reduced to less than $1/100,000$. When overflow occurs, a time for coding two macroblocks is additionally required but is inconsequential as compared with the load of the CPU reduced by a packing support.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A video coding system for performing video coding through DCT (Discrete Cosine Transform), MC (Motion Compensation) and ME (Motion Estimation), comprising:
   an MC unit for producing an MAD (Mean Absolute Difference) value of a current macroblock;
   a control unit for estimating the number of bits of the current macroblock based on the MAD value and a QP (Quantization Parameter) and controlling an end of a VP (Video Packet); and
   a VLC (Variable length coding) unit for performing the ME, texture coding, and a packing task associated with all macroblocks of the VP under control of the control unit,
   wherein the MAD value is a value produced by dividing a sum of absolute values of pixels by constant number after calculating a difference value between current frame data and motion estimation data for a single macroblock,
   wherein the control unit estimates the number of bits of the current macroblock by means of an equation and decides the end of the VP when a value of adding a "bit_est" value to a sum of the number of bits of up to a previous macroblock is larger than a predetermined target VP length, and
   wherein the equation is "bit_est=k×(MAD/QP)+offset" where "bit_est" denotes the estimated number of bits, "k" denotes a constant produced by experimentation, and "offset" is a parameter for controlling the probability of a macroblock to be coded within the estimated number of bits,
   whereby a reading/writing operation associated with a VLC memory, a shift operation and a logic operation are not additionally required after macroblock coding or video packet coding is completed.

2. The video coding system of claim 1, wherein the VLC unit comprises:
   a header coding control part (header_ctrl) responsible for controlling header coding;
   a header ROM (Read Only Memory) table (mb_rom) including various tables necessary for the header coding;
   a header memory (hmem) for storing a result of the header coding;
   a texture coding control part (texture_ctrl) responsible for controlling texture coding;
   a texture ROM table (ac_rom) including various tables necessary for the texture coding;
   a texture memory (tmem) for storing a result of the texture coding;
   a packing execution part (pack_ctrl) responsible for packing the header and texture; and
   a VLC register (vlc_reg) for storing various setup items necessary for the header and texture coding.

3. The video coding system of claim 2, wherein the packing execution part (pack_ctrl) comprises:
   a packing control sub-part responsible for entirely controlling the packing execution part (pack_ctrl);
   a packing operation sub-part for performing the packing task;
   a texture memory control sub-part for sending data necessary for the packing task from the texture memory (tmem) to the packing operation sub-part; and
   a header memory control sub-part for sending data necessary for the packing task from the header memory (hmem) to the packing operation sub-part, and writing the packed data to the header memory (hmem).

4. The video coding system of claim 3, wherein the packing control sub-part determines whether or not the header coding and the texture coding have been completed, respectively, through signals "tend" and "hend" when a signal "pack_en", "toverflow" or "hoverflow" is 1, and sends a packing start command through a signal "p-start" when the header coding and the texture coding have been completed, respectively.

5. The video coding system of claim 3, wherein the packing operation sub-part comprises:
   a shift & merge element for appropriately shifting and merging data of two A-bit units from the texture memory (tmem) and/or the header memory (hmem), and generating data of a new A-bit unit as a result of packing, "A" contained in the A-bit unit being a value equal to or greater than a width value of the texture memory (tmem) and a width value of the header memory (hmem); and
   a register file element for storing information ("pre_1_start_pos", "pre-h2_start_pos" and "pre_t_start_pos") indicating start positions of Header 1, Header 2 and texture data of a first macroblock of the VP so that coded data of all macroblocks included in the VP can be packed.

* * * * *